(No Model.)
E. P. ALEXANDER.
Nut Lock.
No. 230,913.          Patented Aug. 10, 1880.
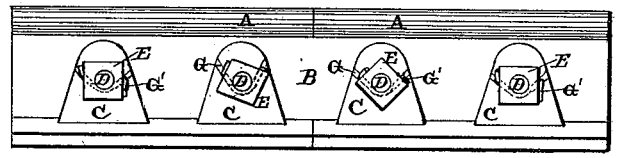
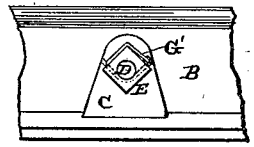
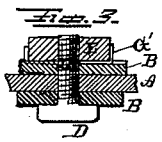
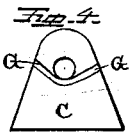
Witnesses:
W. W. Mortimer
Charles H. Isham
Inventor:
E. P. Alexander,
per
F. A. Lehmann,
Atty

UNITED STATES PATENT OFFICE.

EDWARD P. ALEXANDER, OF CLINTON, NEW YORK.

NUT-LOCK.

SPECIFICATION forming part of Letters Patent No. 230,913, dated August 10, 1880.

Application filed May 21, 1880. (No model.)

*To all whom it may concern:*

Be it known that I, EDWARD P. ALEXANDER, of Clinton, in the county of Oneida and State of New York, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates to an improvement in nut-locks; and it consists in locking the nut in place by making a groove in the face of the washer, and in which groove is placed a wire or rod of any suitable kind, which rod or wire is bent into any suitable shape so that it cannot be moved endwise, and which has its ends either turned upward toward the rotating points upon the opposite sides of the nut, or bent entirely around one-half of the nut and then fastened together, as will be more fully described hereinafter.

The object of my invention is to lock the nut in place by a simple piece of wire or a small metallic rod of any kind without making a groove in the inner face of the nut.

Figures 1 and 2 are plan views of two forms of my invention. Fig. 3 is a vertical section taken through Fig. 1. Fig. 4 is a plan view of the washer alone.

A represents the two ends of adjoining rails; B, the fish-plate; C, the washer; D, the bolt, and E the nut.

The fish-plate is applied to the rails in the usual manner, and the washer has its lower end made to bear against the lower flange of the rail, so that it cannot be turned around after the bolt has once been passed through it. In the face of this washer is made a curved or angular groove, G, in which is to be placed a small bent piece of wire or rod, G', of any kind, which rod or wire will be long enough to have its ends project beyond opposite sides of the nut, and either be turned upward toward the rotating points of the nut or be passed around one-half of the nut and then have its two ends fastened together. This groove is made curved or angular, as shown, for the purpose of preventing the wire or rod from being moved endwise, whereby it is much more securely held in place than can be done where the groove extends straight across the face of the washer, as has heretofore been the case. There is no groove made in the inner face of the nut; but the nut serves to hold the wire or rod rigidly in place.

Heretofore a groove has been made in both the under side of the nut and the face of the washer, and a rod has been passed through the grooves thus made, which holds the nut in place only when the nut is turned into certain positions, and this I disclaim. By having the groove made in the face of the washer only the ends can be turned upward or wrapped around one-half of the nut in any position into which the nut may be turned.

Where the washer is a round one, and there is no projecting shoulder or flange for it to catch against, the washer can be held in place by having suitable projections extending into the surface upon which it rests; and then the wire or rod can be applied to this washer, as already described.

Having thus described my invention, I claim—

The combination of the washer C, having the groove G made in its face so as to sweep around the bolt-hole, the nut E, and the wire or rod G', the projecting ends of the wire being turned over against the nut and wrapped around one-half of the nut, substantially as shown.

In testimony that I claim the foregoing I have hereunto set my hand this 20th day of May, 1880.

EDWARD P. ALEXANDER.

Witnesses:
CHAS. H. ISHAM,
F. A. LEHMAN.